Figure 1:
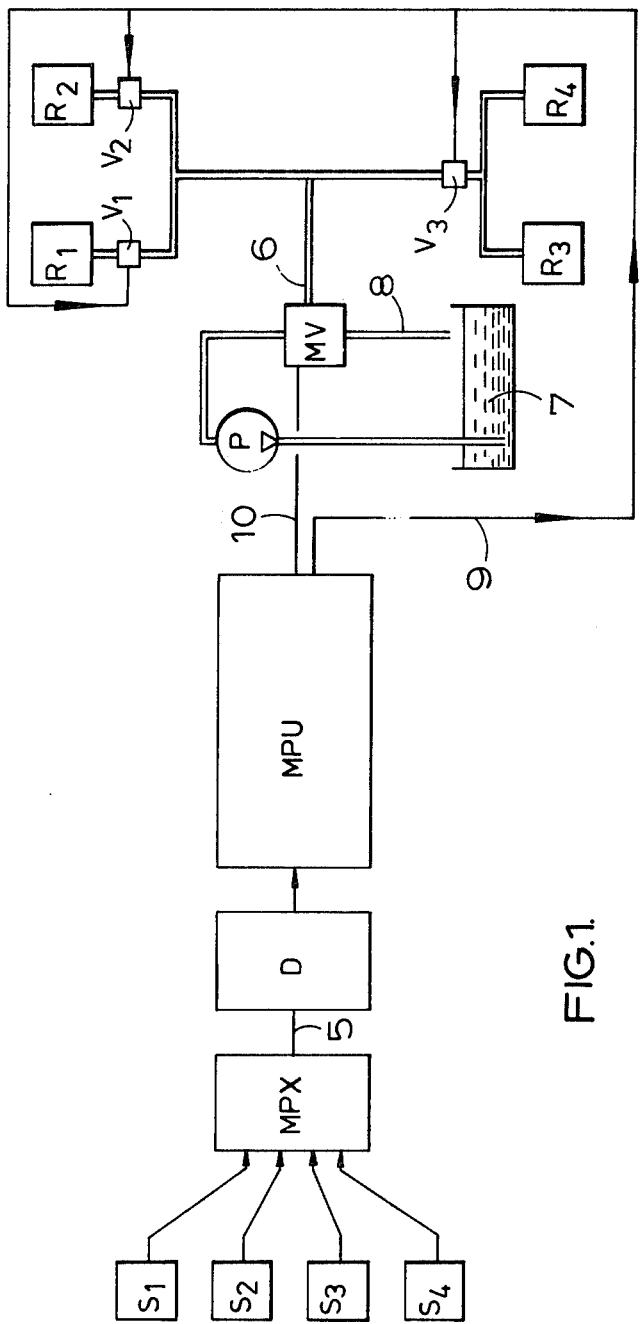

United States Patent [19]
Brearley

[11] Patent Number: 4,483,546
[45] Date of Patent: Nov. 20, 1984

[54] SELF-LEVELLING SUSPENSION

[75] Inventor: Malcolm Brearley, Solihull, England

[73] Assignee: Lucas Industries public limited company, Birmingham, England

[21] Appl. No.: 361,352

[22] Filed: Mar. 24, 1982

[30] Foreign Application Priority Data

Apr. 8, 1981 [GB] United Kingdom ................ 8110972

[51] Int. Cl.³ ............................................ B60G 17/00
[52] U.S. Cl. ............................... 280/6 R; 280/DIG. 1
[58] Field of Search ............... 280/6 R, 6 H, 6.1, 707, 280/DIG. 1

[56] References Cited

U.S. PATENT DOCUMENTS

| | | | |
|---|---|---|---|
| 3,124,368 | 3/1964 | Corley et al. | 280/707 |
| 3,881,736 | 5/1975 | Wilfert | 280/6.1 |
| 4,185,845 | 1/1980 | Misch et al. | 280/DIG. 1 |
| 4,266,790 | 5/1981 | Uemura et al. | 280/6.1 |

Primary Examiner—Joseph F. Peters, Jr.
Assistant Examiner—Ross Weaver
Attorney, Agent, or Firm—Scrivener, Clarke, Scrivener and Johnson

[57] ABSTRACT

A sensor is associated with each suspension unit for adjusting the ride height of a vehicle, and each sensor gives an output that varies progressively with ride height. A control circuit, preferably microprocessor based, is arranged to (i) read each of the outputs at least once, preferably in sequence,
(ii) select the output which corresponds to the sensed ride height that differs most from the desired ride height, and
(iii) apply a correction to the suspension unit associated with the selected output to adjust it towards the desired ride height.

The control circuit repeats (i) to (iii) until all the sensed ride heights are within acceptable limits of the desired height whereupon the system enters a so-called trim mode. In this mode corrections are based on a calculated ride height at a conceptual center of height where height variations due to pitch and roll are minimal.

14 Claims, 2 Drawing Figures

SELF-LEVELLING SUSPENSION

SPECIFIC DESCRIPTION

This invention relates to so-called self-levelling suspension system for vehicles, that is, suspension systems that automatically adjust the ride height between the sprung and unsprung parts of the vehicle to compensate for any alteration or redistribution of load.

The sprung parts of the vehicle, namely the body and its associated components, are supported above the unsprung parts (the wheels, axles etc) by a number of suspension units of adjustable length.

Generally speaking, known self-levelling suspension systems are based on closed loop control, which involves monitoring the ride height in the vicinity of each suspension unit and adjusting its length until the difference between the actual and desired ride heights is within a certain range. The main problem with this kind of control is that when the vehicle is in motion the actual ride height is constantly varying due to suspension oscillation, cornering, and acceleration or deceleration, so either the system constantly tries to compensate for these variations or there has to be an in-built delay before correction commences.

What is now proposed is essentially a form of discontinuous closed loop control using open loop increments of correction.

According to the present invention, a self-levelling suspension system for a vehicle comprises a plurality of suspension units for adjusting the ride height between the sprung and unsprung parts of the vehicle until the height is within acceptable limits of a desired ride height, a respective ride height sensor associated with each suspension unit and adapted to give an output that varies progressively with the ride height in the vicinity of the associated suspension unit, and control means for
 (i) reading each of the output at least once,
 (ii) selecting the output which corresponds to the sensed ride height that differs most from the desired ride height, and
 (iii) applying a correction to the suspension unit associated with the selected output to adjust it towards the desired ride height,
the control means being arranged to repeat (i) to (iii) until all the sensed ride heights are within acceptable limits of the desired ride height.

Since the corrections are made one at a time the adjustment rate of the suspension units may be closely defined enabling the magnitude of the necessary corrections to be calculated with considerable accuracy. Furthermore, the capacity of the system will always be directed towards correcting the worst error.

Preferably the control means is arranged to read each of the outputs in sequence. Apart from the cost saving involved in using a single control means sequentially to scan the sensors there is also the advantage that any drift or circuit malfunction will be likely to affect all corrections equally, so such factors will result in an overall alteration in ride height rather than changes in attitude.

Preferably the control means is arranged to read each of the outputs in sequence a plural number of times and calculate for each sensor a computed average value for the readings from that sensor, the computed average values being used in selecting the required output. The computed average value is not necessarily the strict mathematical means value but may, for example, be weighted in favour of the later readings. Preferably the number of readings used in calculating the computed average value for a particular sensor output is varied in accordance with the degree of suspension activity, which may for example be ascertained from the range of readings from that sensor in a predetermined period. The readings are preferably taken at a constant rate but the period over which the readings are taken is varied. The number of readings could be increased in accordance with journey time since rapid corrections are only likely to be required at the commencement of a journey.

The control means is preferably arranged to apply a correction which should be sufficient to reduce the difference between the selected and desired ride heights to less than the next greatest difference between the sensed and desired ride heights. Preferably the control means is arranged to apply a predetermined minimum correction unless the difference between the selected and desired ride heights is less than that predetermined correction.

In a preferred arrangement the control means is arranged to operate in a trim mode when all the sensed heights are within acceptable limits of the desired ride height, in which the control means calculates computed average values for all the sensor readings, uses the computed average vaues to calculate a central ride height for the vehicle, checks the central ride height to see whether it falls within acceptable limits of a desired central ride height, and re-enters the initial mode if the central ride height is found to be outside the acceptable limits. Preferably the computed average values calculated in the trim mode are based on a larger number of readings than are used in calculating the computed average values in the initial mode.

The control means preferably comprises:
 reading means for (i) reading each of the outputs at least once,
 selection means for (ii) selecting the output which corresponds to the sensed ride height that differs most from the desired ride height, and
 correction signal generating means for (iii) applying a correction to the suspension unit(s) associated with the selected output to adjust it towards the desired ride height,
the controls means being arranged to repeat (i) to (iii) until all the sensed ride heights are within acceptable limits of the desired ride height.

The reading means, the selection means and the correction signal generating means may be in the form of respective logic circuits or, more preferably, they may be provided by a microprocessor.

The invention also includes a method of adjusting a vehicle suspension system which comprises a plurality of suspension units for adjusting the ride height between the sprung and unsprung parts of the vehicle, the method comprising:
 (a) sensing the ride height in the vicinity of each suspension unit
 (b) selecting the senced ride height that differs most from the desired ride height,
 (c) applying a correction to the corresponding suspension unit to adjust it towards the desired ride height, and
 (d) repeating (a) to (c) if necessary until all the sensed ride heights are within acceptable limits of the desired right height.

Figure 2:
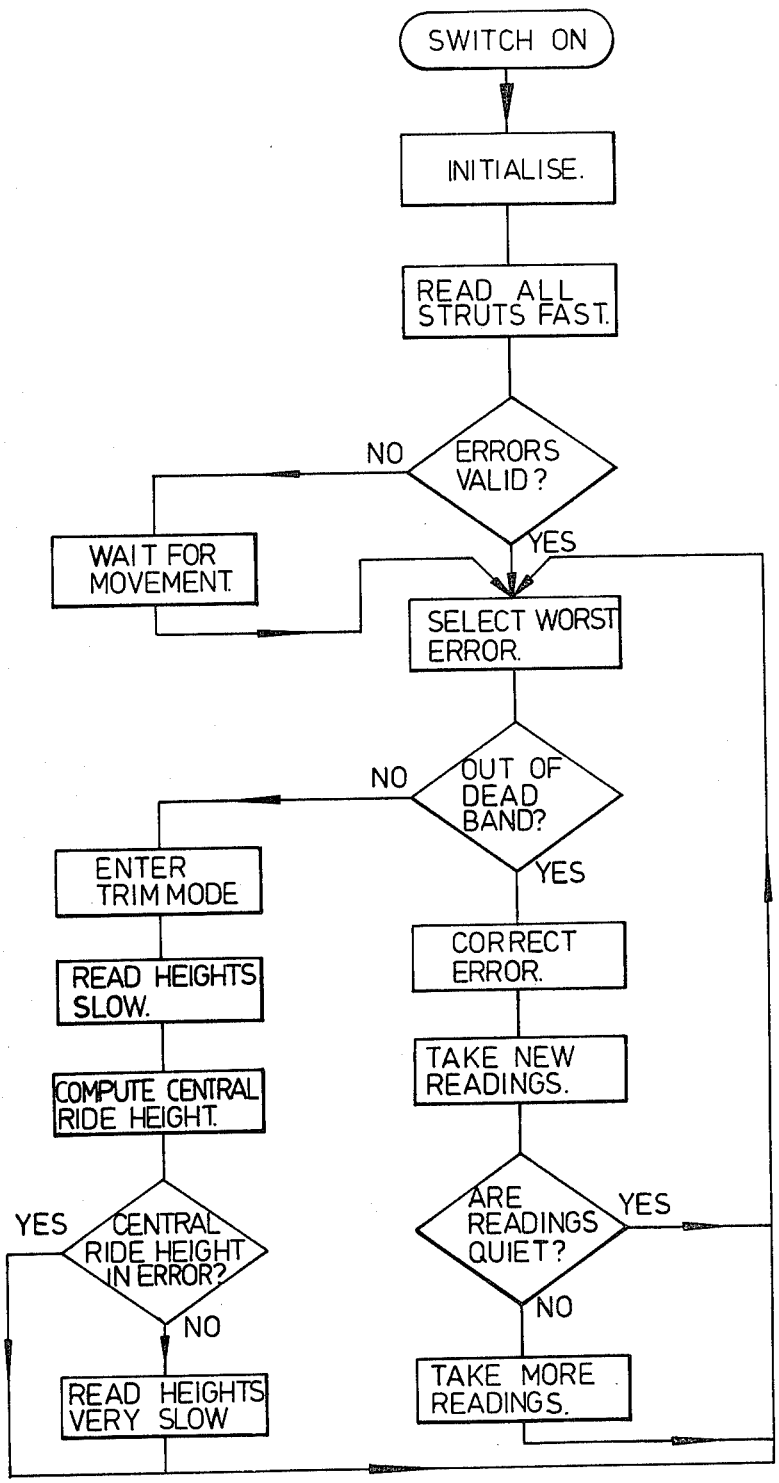

The invention will now be further described, by way of example only, with reference to the accompanying drawings of which:

FIG. 1 is a block diagram of a vehicle self-levelling suspension system according to the invention, and FIG. 2 is a flow diagram that illustrates how the system operates.

Referring to FIG. 1, four suspension units in the form of struts $R_1$ to $R_4$ support the sprung parts of the vehicle above the unsprung part. Each strut, $R_1$ to $R_4$, is associated with a ride height sensor, $S_1$ to $S_4$ respectively, having an electrical characteristic that varies in proportion to the length of the strut, e.g. resistance or impedance. (A suitable sensor is described in UK Patent Specification No. 2 074 736A.)

Struts $R_1$ and $R_2$ are mounted at the front of the vehicle, one on each side. The hydraulic height adjustment chambers of the struts are connected via respective solenoid-operated control valves $V_1$, $V_2$, to a common port 6 of a three-way master valve MV, also solenoid-operated. Struts $R_3$ and $R_4$ are mounted at the rear of the vehicle, on opposite sides, and their hydraulic chambers are both connected via a single solenoid-operated control valve $V_3$ to the common port 6 of the master valve MV. The master valve is switchable to connect the control valves $V_1$ to $V_3$ either to a high pressure fluid source, provided by a pump P for supplying fluid at a constant flow rate from a reservoir 7, or to reservoir via a return line 8.

Each sensor $S_1$ to $S_4$ is connected to a multiplexing circuit MPX for producing a single multiplexed output 5. This output is connected to a decoding circuit D for converting the multiplex signals into a form which can be handled by a control circuit in the form of a microprocessor MPU of the type sold under the designation MC 6805. The microprocessor has two output channels 9, 10. One channel 9 controls the valves $V_1$ to $V_3$, and the other channel 10 controls the master valve MV.

The operation of the system is best understood with reference to FIG. 2. When no levelling is taking place the control valves $V_1$ to $V_3$ are all closed so that hydraulic fluid is trapped in the struts and the ride height of the vehicle remains constant. "Switch On" occurs when the vehicle ignition key is turned, whereupon an "Initialise" command is generated to start a levelling program.

The levelling program commences by commanding the microprocessor to read all the output signals from the sensors in a predetermined sequence. At this stage it is assumed that the vehicle is stationary and only one set of readings is taken. The readings are stored in the memory of the microprocessor. Next, the readings are analysed to check that they include only valid errors. In this context an error is a difference between the actual reading and the reading corresponding to a desired ride height. An example of a valid error is one that is due to uneven load distribution causing the vehicle to tilt, whereas an example of an invalid error would be one produced when the vehicle was parked with one wheel on the pavement.

If the errors are not valid it is assumed that no height adjustment is required and the system goes into standby until the readings change. But if the errors are valid the worst error is selected and analysed to see whether it falls within acceptable limits of the desired ride height (the so-called dead band). If the error falls outside the dead band a correction is immediately applied to the corresponding strut to bring the vehicle closer to a level condition. This is achieved by generating a signal on output channel 10 to set the master valve according to whether the struct is to be lengthened or shortened, and then applying a pulse on output channel 9 to open the appropriate control valve for a calculated period corresponding to the desired degree of correction.

After this preliminary correction, sequential reading of the sensor outputs recommences and continues until several readings having been obtained for each strut. The sensor output signals are filtered to remove any transient variations and stored. The stored readings are then checked to see how much the readings from each strut differ in a predetermined period. If the readings are quiet (little difference), as might be the case when the vehicle is stationary, the worst error is again selected (which may be the reading from the same strut as before or a different one), checked to see whether it is out of band, and a further correction is applied. This sequence of operations constitutes a so-called fast mode of correction. On the other hand, if there is a substantial difference in the readings, such as might occur when the vehicle is in motion, the length of time over which readings are taken is increased in proportion to the degree of variation ("Take More Reading") so that although the rate at which readings are taken remains constant, the number of readings for any given strut increases. These further readings are stored along with those previously stored. This enables a computed average error to be accurately calculated for each strut from the stored readings, the computed average values being used as the basis for the next selection of the worst error. This latter sequence of operations constitutes a so-called slow mode of correction which the system enters when the vehicle is moving.

The rate at which the struts increase in length is defined due to the fact that the pump is arranged to produce a predictable flow, and the number of struts, of known support area, being adjusted at any given time is known. Of course, the support areas of different struts may differ and this is taken into account in the computation. Similarly the rate at which they decrease in length is also defined. The length of time which the control valves $V_1$ to $V_3$ need be opened for a given change in strut length can therefore be calculated to a reasonable degree of accuracy. The amount of correction applied to each strut is calculated to be at least sufficient to reduce the error below that of the strut with the next largest error, although in practice there is a degree of interaction between the struts and the actual change in strut length will not necessarily be the same as that which the adjustment was intended to produce. For this reason it is preferred not to apply a full correction to a strut or over-compensation may result. In order to ensure that a reasonable degree of correction is applied, a predetermined minimum correction of, say 6 mm is always applied to each strut unless the actual ride height is within 6 mm of the desired ride heigth in which case a smaller correction is applied. In this example the dead band is 2 mm wide.

The program moves around the loop formed between "Select Worst Error" and "Are Reading Quiet?", optionally via "Take More Readings", applying a correction on each occasion. This constitutes an initial mode of relatively rapid correction which embraces the fast and slow modes. After a suitable number of corrections have been made a condition is eventually reached in which the last worst error falls within the dead band, or in other words, all the struts are within acceptable limits of the desired ride height. The system then enters the so-call trim mode which is intended to overcome the tendency for the struts to be continually readjusted in response to statistical errors in the analysis of the normal oscillatory movements between the sprung and unsprung parts.

Once the system enters the trim mode the microprocessor proceeds to take sequential reading from the sensors over an extended period of time. The readings are again stored and the computed average error of the reading for each strut is calculated. These computed average values are then weighted according to the characteristics of the particular vehicle and the weighted values are used to calculate the central ride height, that is, the ride height at conceptual "centre of height" point of the vehicle. The location of this point is determined by the vehicle track, wheelbase, and the location of the struts and height sensors. The ride height at this point is disturbed only to a minor degree by pitch and roll due to vehicle motion. Similarly, if the total load remains constant, but is redistributed, the central ride height will be unaffected. However, if the total load changes, for example through gradual use of fuel, the central ride height will tend to change throughout the journey. The central ride height is checked to see whether it falls within acceptable limits of a desired central ride height ("Central Ride Height In Error?") and if not the program returns to the initial mode and any necessary corrections are made to the struts, these corrections being made in the fast or slow mode as appropriate. If the central ride height does fall within the limits the microprocessor continues to take readings over an even longer period and store them, before recalculating the computed averages and returning to the inital mode. Since in this latter stage of the trim mode the readings are taken over an extremely long period any variation due to normal oscillatory movements, or transient effects such as cornering or braking, will have relatively little effect on the final average. Only prolonged effects due to genuine variations in vehicle load will be likely to affect the final computed averages such as to result in compensatory adjustment of the struts.

A further feature of the system, which is not apparent from FIG. 2, is that, if a sensor develops a fault, the microprocessor uses the readings from the remaining sensors to calculate a reading for the faulty sensor. This reading is then substituted for the incorrect reading so that the vehicle level remains largely unaffected. Such fault conditions may be ascertained by a general comparison of the readings from the different sensors, a lack of variation in the readings from a particular sensor or a reading which is outside the usual range being interpreted as indicative of a fault.

The desired ride heights at which the system aims are determined by desired height parameters for the individual struts and a demand value of the central ride height. By varying the appropriate constants it is possible to modify the overall ride height and/or the attitude of the vehicle according to the speed of the vehicle, as measured by an independent transducer, or by the degree of suspension activity. Thus it might for example be arranged that the front of the vehicle dips when travelling at high speed and/or the overall ride height is reduced. Similarly the overall ride height may be increased when travelling over a deeply undulating surface, e.g. a field, to accommodate the increased degree of suspension activity.

Athough all the struts may be adjusted independently, each strut $R_1$, $R_2$, $R_3R_4$ constituting a respective suspension unit, in practice it is usually acceptable to adjust the two rear structs $R_3$, $R_4$, together as in the manner shown. Although each of these struts has its own ride height sensor $S_3$, $S_4$, the signals derived from these sensors are combined to produce an average reading for the ride height in the region of the rear axle, or they may be combined in the output channel 9, the struts $R_3$, $R_4$ then constituting a single suspension unit.

Instead of providing an individual sensor for each strut as shown, in some cases it may be sufficient to provide only a single sensor for a pair of struts, at the front or the rear of the vehicle. For example, the sensor may be arranged to detect displacement of an anti-roll bar associated with a pair of wheels.

It will be apparent from the foregoing description that the microprocessor comprises, in effect, reading means for reading each of the sensor output corresponding to the sensed ride height that differs most from the desired ride height, and correction signal generating means for applying a correction to the suspension unit associated with the selected output to adjust the unit or units toward the desired ride height. It will be appreciated that all the functions of the microprocessor could be performed by separate logic circuits, or even analogue circuits, using discreet components or integrated circuits.

I claim:

1. A self-levelling suspension system for adjusting the ride height of a vehicle so that is within acceptable limits of a desired ride height comprising a plurality of suspension units for adjusting the ride height between the sprung and unsprung parts of the vehicle, a respective ride height sensor associated with each suspension unit and adapted to give an output that varies progressively with the ride height in the vicinity of the associated suspension unit, and control means for performing the steps of:

(i) reading each of the outputs at least once,
    (ii) selecting the output which corresponds to the sensed ride height that differs most from said desired ride height, and
    (iii) applying a correction only to the suspension unit associated with the selected output to adjust it towards said desired right height, the control means being arranged to repeat steps (i) to (iii) until all the sensed ride heights are within said acceptable limits of said desired ride height.

2. A system according to claim 1, in which the control means is arranged to read each of the outputs in sequence.

3. A system according to claim 2, in which the control means is arranged to read each of the outputs in sequence a plural number of times and calculate for each sensor a computed average value for the readings from that sensor, the computed average values being used in selecting the required output.

4. A system according to claim 3, in which the number of readings used in calculating the computed average value for a particular sensor output is varied in accordance with the degree of suspension activity.

5. A system according to claim 4, in which the degree of suspension activity is ascertained from the range of readings in a predetermined period from the respective sensor.

6. A system according to claim 4 or 5, in which the readings used in calculating the computed average value are taken at a constant rate but the period over which the readings are taken is varied.

7. A system according to any one of claims 1 to 5, in which the control means is arranged to apply a correction which should be sufficient to reduce the difference between the selected and desired ride heights to less than the next greatest difference between the sensed and desired ride heights.

8. A system according to any one of claims 1 to 5, in which the control means is arranged to apply a predetermined minimum correction unless the difference between the selected and desired ride heights is less than that predetermined correction.

9. A system according to any one of claims 1 to 5, in which the control means is arranged to operate in a trim mode when all the sensed heights are within acceptable limits of the desired ride height, in which the control means calculates computed average values for all the sensor readings, uses the computed average values to calculate a central ride height for the vehicle, checks the central ride height to see whether it falls within acceptable limits of a desired central ride height, and re-enters the initial mode if the central ride height is found to be outside the acceptable limits.

10. A system according to claim 9 in which the control means is arranged to read each of the outputs in sequence a plural number of times and calculate for each sensor a computed average value for the readings from that sensor, the computed average values being used in selecting the required output, and in which the computed average values calculated in the trim mode are based on a larger number of readings than are used in calculating the computed average values in the initial mode.

11. A self-levelling suspension system for adjusting the ride height of a vehicle so that it is within acceptable limits of a desired ride height comprising a plurality of suspension unit for adjusting the ride height between the sprung and unsprung parts of the vehicle, a respective ride height sensor associated with each suspension unit and adapted to give an output that varies progressively with the ride height in the vicinity of the associated suspension unit, and control means comprising:
  reading means for (i) reading each of the outputs at least once,
  selection means for (ii) selecting the output which corresponds to the sensed ride height that differs most from said desired right height, and
  correction signal generating means for (iii) applying a correction to the suspension unit associated with the selected output to adjust it towards said desired ride height,
the control means being arranged to repeat (i) to (iii) until all the sensed ride heights are within said acceptable limits of said desired ride height.

12. A system according to claim 11, in which the reading means, the selection means and the correction signal generating means are in the form of respective logic circuits.

13. A system according to claim 11, in which the reading means, the selection means and the correction signal generating means are provided by a microprocessor.

14. A method of adjusting a vehicle suspension system to within acceptable limits of a desired ride height, and which system comprises a plurality of suspension units for adjusting the ride height between the sprung and unsprung parts of the vehicle, the method comprising the steps of:
  (a) sensing the individual ride height in the vicinity of each of the suspension units,
  (b) selecting the sensed ride height that differs most from said desired ride height,
  (c) applying a correction only to the corresponding suspension unit to adjust it towards said desired ride height, and
  (d) repeating steps (a) to (c) if necessary until all the sensed ride heights are within said acceptable limits of said ride height.

* * * * *